United States Patent
Kadoi et al.

(10) Patent No.: US 12,074,293 B2
(45) Date of Patent: Aug. 27, 2024

(54) SECONDARY BATTERY INCLUDING ELECTRODE WITH SLIT ALONG WINDING DIRECTION IN NON-FORMATION PORTION

(71) Applicant: Prime Planet Energy & Solutions, Inc., Tokyo (JP)

(72) Inventors: Masafumi Kadoi, Chita (JP); Takahiro Sakurai, Nagoya (JP); Kosuke Suzuki, Toyota (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 156 days.

(21) Appl. No.: 17/470,215

(22) Filed: Sep. 9, 2021

(65) Prior Publication Data

US 2022/0085417 A1    Mar. 17, 2022

(30) Foreign Application Priority Data

Sep. 17, 2020   (JP) ................. 2020-156475

(51) Int. Cl.
| | |
|---|---|
| *H01M 10/0585* | (2010.01) |
| *H01M 4/13* | (2010.01) |
| *H01M 4/36* | (2006.01) |
| *H01M 10/0525* | (2010.01) |
| *H01M 10/0587* | (2010.01) |
| *H01M 50/103* | (2021.01) |

(52) U.S. Cl.
CPC ......... *H01M 10/0585* (2013.01); *H01M 4/13* (2013.01); *H01M 4/36* (2013.01); *H01M 10/0587* (2013.01); *H01M 50/103* (2021.01); *H01M 10/0525* (2013.01)

(58) Field of Classification Search
CPC ........ H01M 4/13; H01M 4/36; H01M 50/103; H01M 10/0585; H01M 10/0587
USPC ........................................ 429/209, 233, 241
See application file for complete search history.

(56) References Cited

U.S. PATENT DOCUMENTS

| | | | |
|---|---|---|---|
| 2013/0216879 A1* | 8/2013 | Egawa ................ | H01M 10/052 429/94 |
| 2014/0178731 A1 | 6/2014 | Kobayashi et al. | |

(Continued)

FOREIGN PATENT DOCUMENTS

| | | |
|---|---|---|
| CN | 103718365 A | 4/2014 |
| CN | 105591148 A | 5/2016 |
| JP | 2006-221817 A | 8/2006 |

(Continued)

*Primary Examiner* — Sean P Cullen
(74) *Attorney, Agent, or Firm* — HAUPTMAN HAM, LLP

(57) ABSTRACT

A secondary battery includes a flat wound electrode body in which an electrode sheet is wound, and an electrode terminal. The electrode sheet has a current collector, an electrode active material layer which is formed on a surface of the current collector, and a non-formation portion in which the electrode active material layer is not formed on the surface of the current collector. The wound electrode body has a first end portion in which a rounded portion is formed. A first slit is formed along a winding direction in the non-formation portion at the first end portion. A flat surface portion to which the electrode terminal is joined is provided in a portion positioned further toward opposite than the first slit from the electrode active material layer in a portion of the non-formation portion at the first end portion.

16 Claims, 5 Drawing Sheets

(56) References Cited

U.S. PATENT DOCUMENTS

2016/0133985 A1    5/2016  Harayama
2021/0234203 A1*   7/2021  Jang .................... H01M 50/105

FOREIGN PATENT DOCUMENTS

| JP | 2008218234 | A | * | 9/2008 |
| JP | 2011159518 | A | | 8/2011 |
| JP | 201337816 | A | | 2/2013 |
| JP | 2013037816 | A | * | 2/2013 |
| JP | 2013-98026 | A | | 5/2013 |
| JP | 2013105623 | A | * | 5/2013 |
| JP | 2013149388 | A | * | 8/2013 |
| JP | 2013218804 | A | * | 10/2013 |
| JP | 2015046297 | A | * | 3/2015 |
| JP | 2016-178053 | A | | 10/2016 |
| WO | 2013021463 | A1 | | 2/2013 |

* cited by examiner

SECONDARY BATTERY INCLUDING ELECTRODE WITH SLIT ALONG WINDING DIRECTION IN NON-FORMATION PORTION

CROSS REFERENCE TO RELATED APPLICATIONS

The present application claims priority based on Japanese Patent Application No. 2020-156475 filed on Sep. 17, 2020, the entire contents of which are incorporated herein by reference in its entirety.

BACKGROUND

The present invention relates to a secondary battery.

For example, Japanese Patent Application Publication No. 2013-218804 discloses a secondary battery which includes a battery case, and a flat wound electrode body which is accommodated in the battery case. The wound electrode body has, e.g., a positive electrode plate, and a non-formation portion, in which an active material is not formed, is formed at one end portion of the positive electrode plate in a winding axis direction. An electrode terminal is connected to the non-formation portion of the positive electrode plate. The electrode terminal has an internal terminal portion (referred to as a current collector in Japanese Patent Application Publication No. 2013-218804) disposed inside the battery case, and the internal terminal portion of the electrode terminal is joined to the non-formation portion in the battery case. In addition, in the secondary battery disclosed in Japanese Patent Application Publication No. 2013-218804, at both end portions of the positive electrode plate in the winding axis direction, a plurality of slits extending in the winding axis direction are formed at regular intervals, and penetration of an electrolyte into the wound electrode body from the slits is thereby facilitated.

In addition, Japanese Patent Application Publication No. 2013-98026 discloses a wound electrode body which has a positive electrode plate, a negative electrode plate, and a separator. The positive electrode plate has a coated portion in which a positive electrode active material layer is formed, and an uncoated portion in which the positive electrode active material layer is not formed. In the vicinity of a boundary between the coated portion and the uncoated portion, a plurality of slits are formed at regular intervals along a winding direction of the wound electrode body. With this, it is possible to prevent occurrence of a wrinkle which may occur in the vicinity of the boundary and rupture of the positive electrode plate.

Incidentally, in the secondary battery disclosed in Japanese Patent Application Publication No. 2013-218804, the electrode terminal is connected to the non-formation portion positioned in a central portion of the wound electrode body in a longitudinal direction. As a result, in the battery case, the internal terminal portion of the electrode terminal is relatively long. From the viewpoint of material cost, the electrode terminal is preferably short.

SUMMARY

A secondary battery proposed herein includes a flat wound electrode body in which an electrode sheet of a positive electrode or a negative electrode is wound about a winding axis in a predetermined winding direction, a battery case which accommodates the wound electrode body, and an electrode terminal. The electrode terminal has an external terminal portion disposed outside the battery case and an internal terminal portion disposed inside the battery case. The electrode sheet has a current collector, an electrode active material layer which extends in the winding direction, is formed on a surface of the current collector, and contains an electrode active material, and a non-formation portion which extends in the winding direction and is disposed at a position adjacent to the electrode active material layer in a winding axis direction and in which the electrode active material layer is not formed on the surface of the current collector. The wound electrode body has a flat portion which has two flat surfaces extending in a longitudinal direction orthogonal to the winding axis direction, a first end portion which is provided on one side in the longitudinal direction in the flat portion and in which a rounded portion is formed, and a second end portion which is provided on another side in the longitudinal direction in the flat portion and in which the rounded portion is formed. A first slit is formed along the winding direction in a portion of the non-formation portion positioned at the first end portion. A flat surface portion to which the internal terminal portion of the electrode terminal is joined is provided in a portion positioned further toward opposite than the first slit from the electrode active material layer in the portion of the non-formation portion positioned at the first end portion.

For example, when the first slit is not formed in the portion of the non-formation portion positioned at the first end portion, the non-formation portion is brought into a state in which the rounded portion is formed, and it is difficult to join the electrode terminal to the portion of the non-formation portion positioned at the first end portion. However, according to the secondary battery proposed herein, by forming the first slit in the non-formation portion, it becomes easy to flatten the portion of the non-formation portion positioned at the first end portion, and it is easy to provide the flat surface portion in the non-formation portion. Therefore, it is possible to reliably join the electrode terminal to the portion of the non-formation portion positioned at the first end portion and, as a result, the length of the electrode terminal can be made shorter than the length of a conventional electrode terminal.

In the secondary battery proposed herein, a second slit which is disposed further toward opposite than the first slit from the electrode active material layer and extends along the winding axis direction may be formed in the non-formation portion positioned at the first end portion. In addition, the second slit may be formed at a position farthest from the winding axis in the non-formation portion positioned at the first end portion.

In the secondary battery proposed herein, an interval between the second slits when the electrode sheet is unfolded may decrease gradually with increasing approach to a winding start side in the winding direction. In addition, an interval between the first slits when the electrode sheet is unfolded may decrease gradually with increasing approach to the winding start side in the winding direction.

In the secondary battery proposed herein, a length of the first slit may decrease with increasing approach to the winding axis.

DETAILED DESCRIPTION

Figure 1:
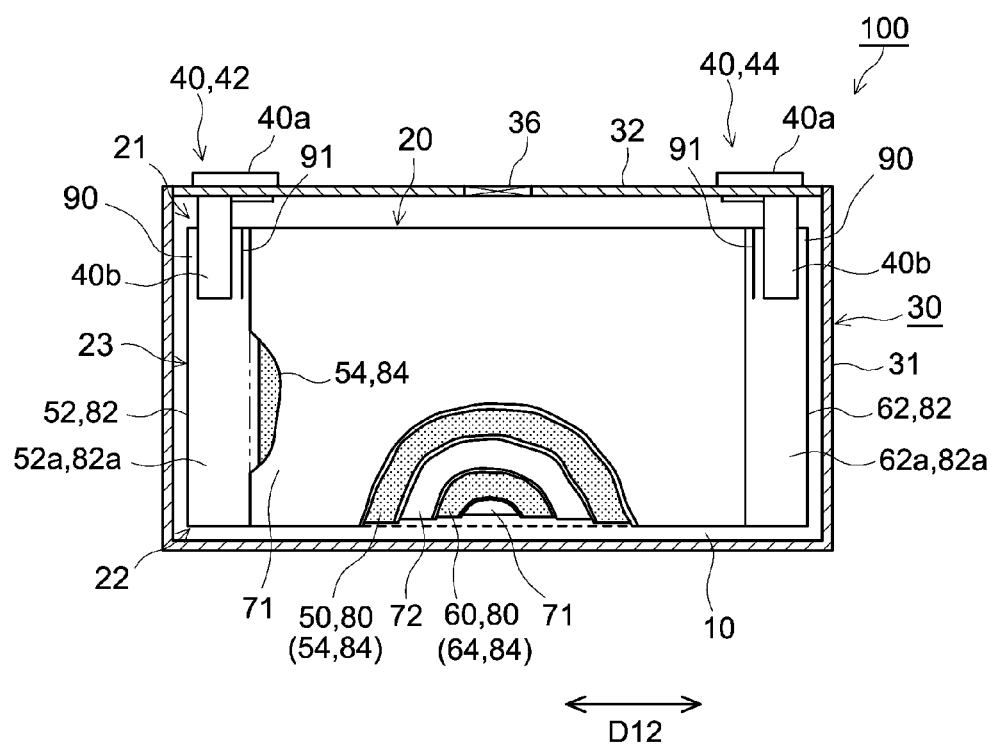
FIG. 1 is a cross-sectional view schematically showing an internal structure of a secondary battery according to an embodiment.

Hereinbelow, an embodiment of a secondary battery disclosed herein will be described with reference to the drawings. Note that, apart from matters which are specifically mentioned in this specification, other matters which are necessary for implementation of the present invention can be understood as design matters of those skilled in the art based on the conventional art in the field. The present invention can be implemented based on contents disclosed in the present specification and common general technical knowledge in the field. In addition, in the following drawings, members and portions which have the same functions are designated by the same reference numerals, and the description thereof is made.

In the present specification, a "battery" is a term which denotes ordinary storage devices capable of extracting electrical energy, and is a concept including a primary battery and a secondary battery. A "secondary battery" denotes ordinary storage devices which can be charged and discharged repeatedly, and includes a so-called storage battery such as a lithium secondary battery, a nickel-metal hydride battery, or a nickel-cadmium battery. Hereinbelow, a secondary battery disclosed herein will be described in detail by using, as an example, a lithium ion secondary battery which is a type of the secondary battery. Note that the secondary battery disclosed herein is not intended to be limited to the embodiment described herein.

FIG. 1 is a cross-sectional view schematically showing an internal structure of a secondary battery 100 according to the present embodiment. As shown in FIG. 1, the secondary battery 100 according to the present embodiment is a sealed lithium ion secondary battery including a battery case 30, electrode terminals 40, a wound electrode body 20, and a nonaqueous electrolyte solution 10.

The battery case 30 accommodates the wound electrode body 20 and the nonaqueous electrolyte solution 10 in a state in which the wound electrode body 20 and the nonaqueous electrolyte solution 10 are sealed in the battery case 30. In the present embodiment, the shape of the battery case 30 is a rectangular parallelepiped shape, and is a flat square shape. The battery case 30 includes a main body 31, and a lid 32. The main body 31 is a square hollow member having an opening portion (not shown) at one end (e.g., an upper end). The lid 32 is a plate-like member which covers the opening portion of the main body 31. The lid 32 is mounted to the main body 31.

A safety valve 36 is provided in the lid 32. The safety valve 36 is provided in order to release an internal pressure of the battery case 30 where the internal pressure of the battery case 30 rises to be equal to or higher than a predetermined pressure. In addition, an injection hole (not shown) for injecting the nonaqueous electrolyte solution 10 into the main body 31 is provided in the battery case 30. The material of the battery case 30 is not particularly limited and, as the material of the battery case 30, a metal material which is light and has high heat conductivity such as, e.g., aluminum is used.

The electrode terminal 40 is a long flat member, and is formed of a conductive material such as aluminum. The electrode terminal 40 is provided in the lid 32 of the battery case 30. The electrode terminal 40 has an external terminal portion 40a disposed outside the battery case 30, and an internal terminal portion 40b disposed inside the battery case 30. The external terminal portion 40a is exposed to the outside of the battery case 30 from the lid 32. The external terminal portion 40a is configured to be connected to another battery or external equipment. In the present embodiment, the electrode terminal 40 of a positive electrode is referred to as a positive electrode terminal 42, and the electrode terminal 40 of a negative electrode is referred to as a negative electrode terminal 44.

Figure 2:
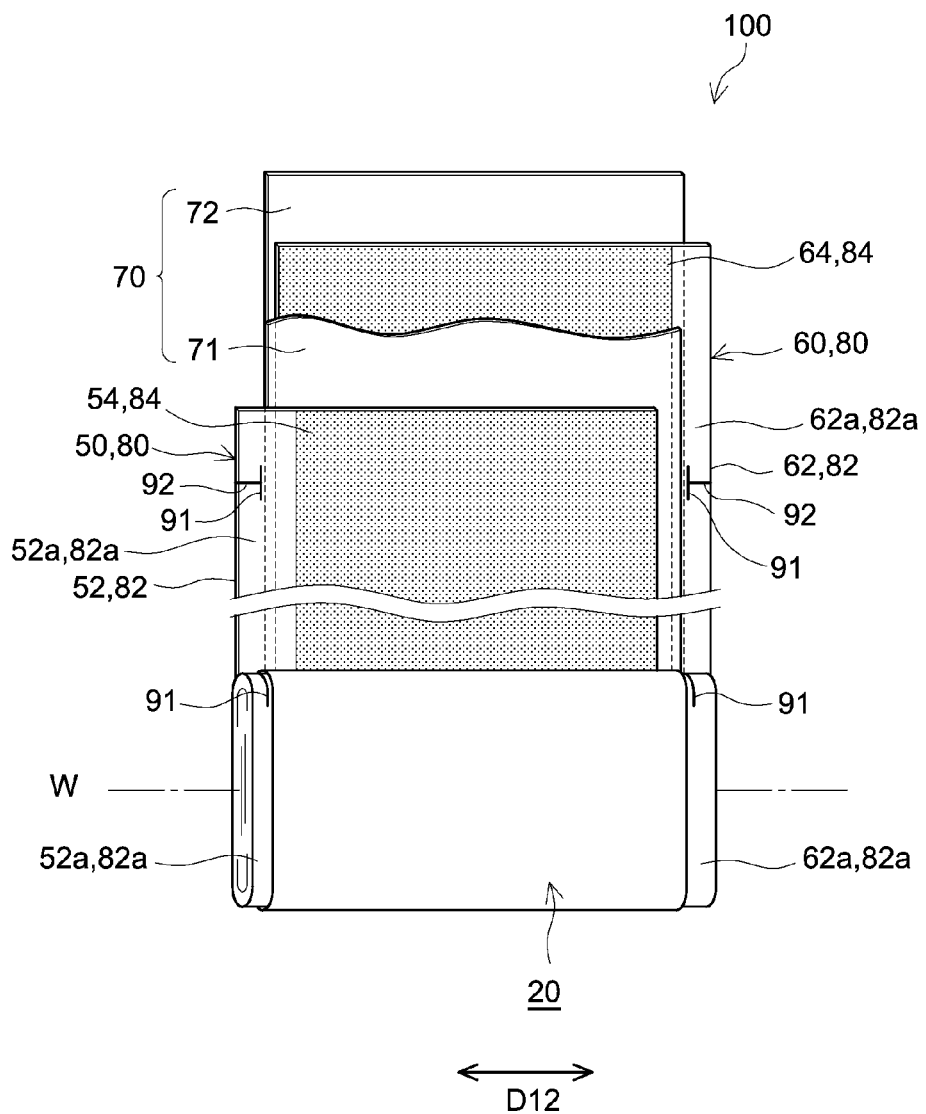
FIG. 2 is a schematic view showing a configuration of a wound electrode body of the secondary battery according to the embodiment, and is a view in which part of the wound electrode body is unfolded.

FIG. 2 is a schematic view showing a configuration of the wound electrode body 20 of the secondary battery 100 according to the present embodiment, and is a view in which part of the wound electrode body 20 is unfolded. As shown in FIG. 2, the wound electrode body 20 has a long electrode sheet 80 of the positive electrode or the negative electrode, and a long separator 70. In the present embodiment, the electrode sheet 80 has a positive electrode sheet 50 of the positive electrode, and a negative electrode sheet 60 of the negative electrode. The separator 70 has a first separator 71 and a second separator 72, and is constituted by the two separators. Herein, the wound electrode body 20 is a flat electrode body in which the positive electrode sheet 50, the negative electrode sheet 60, and the separator 70 are stacked and wound about a winding axis W in a winding direction D11 (see FIG. 4). In the present embodiment, the positive electrode sheet 50, the first separator 71, the negative electrode sheet 60, and the second separator 72 are stacked in this order.

In the present embodiment, the electrode sheet 80 has a current collector 82, an electrode active material layer 84 which contains an electrode active material, and a non-formation portion 82a. The current collector 82 has a long shape. The electrode active material layer 84 is formed on one surface or both surfaces (both surfaces in the present embodiment) of the current collector 82 so as to extend in the winding direction D11 (see FIG. 4). The non-formation portion 82a denotes a portion of the current collector 82 on which the electrode active material layer 84 is not formed. The non-formation portion 82a extends in the winding direction D11 (see FIG. 4), and is disposed at a position adjacent to the electrode active material layer 84 in a direction (hereinafter referred to as a winding axis direction) D12 in which the winding axis W extends.

In the present embodiment, in the positive electrode sheet 50, the current collector 82, the electrode active material layer 84, and the non-formation portion 82a are referred to as a positive electrode current collector 52, a positive electrode active material layer 54, and a positive electrode non-formation portion 52a, respectively. The positive electrode active material layer 54 contains a positive electrode active material serving as an example of the electrode active material. The positive electrode non-formation portion 52a is formed at an end portion on one end side (a left end side in FIG. 2) in the winding axis direction D12 in the positive electrode current collector 52. As shown in FIG. 1, to the positive electrode non-formation portion 52a, the internal terminal portion 40b of the positive electrode terminal 42 is joined.

In the present embodiment, as the positive electrode current collector 52, it is possible to use a current collector which is used as the positive electrode current collector of the secondary battery of this type without particular limitation. As the positive electrode current collector 52, it is preferable to use a metal positive electrode current collector having excellent conductivity. As the positive electrode current collector 52, it is possible to use a metal material such as, e.g., aluminum, nickel, titanium, or stainless steel. It is preferable to use especially aluminum (e.g., aluminum foil) as the positive electrode current collector 52.

Examples of the positive electrode active material contained in the positive electrode active material layer 54 include lithium composite metal oxides having a layer structure or a spinel structure (e.g., $LiNi_{1/3}Co_{1/3}Mn_{1/3}O_2$, $LiNiO_2$, $LiCoO_2$, $LiFeO_2$, $LiMn_2O_4$, $LiNi_{0.5}Mn_{1.5}O_4$, $LiCrMnO_4$, and $LiFePO_4$). The positive electrode active material layer 54 can be formed by dispersing the positive electrode active material and a material used on an as-needed basis (e.g., a conductive material or a binder) in an appropriate solvent (e.g., N-methyl-2-pyrrolidone: NMP) to prepare a pasty (or slurry-like) composition, applying an appropriate amount of the composition to the surface of the positive electrode current collector 52, and drying the composition.

As shown in FIG. 2, in the negative electrode sheet 60, the current collector 82, the electrode active material layer 84, and the non-formation portion 82a are referred to as a negative electrode current collector 62, a negative electrode active material layer 64, and a negative electrode non-formation portion 62a, respectively. The negative electrode active material layer 64 contains a negative electrode active material serving as an example of the electrode active material. The negative electrode non-formation portion 62a is formed at an end portion on the other end side (a right end side in FIG. 2) in the winding axis direction D12 in the negative electrode current collector 62. As shown in FIG. 1, to the negative electrode non-formation portion 62a, the internal terminal portion 40b of the negative electrode terminal 44 is joined.

In the present embodiment, as the negative electrode current collector 62, it is possible to use a current collector which is used as the negative electrode current collector of the secondary battery of this type without particular limitation. As the negative electrode current collector 62, it is preferable to use a metal negative electrode current collector having excellent conductivity. As the negative electrode current collector 62, it is possible to use, e.g., copper (e.g., copper foil) or an alloy consisting mainly of copper.

Examples of the negative electrode active material contained in the negative electrode active material layer 64 include a particulate (or spherical or scaly) carbon material including a graphite structure (e.g., a layer structure) in at least part of the carbon material, a lithium transition metal composite oxide (e.g., a lithium-titanium composite oxide such as $Li_4Ti_5O_{12}$ or the like), and a lithium transition metal composite nitride. The negative electrode active material layer 64 can be formed by dispersing the negative electrode active material and a material used on an as-needed basis (e.g., a binder) in an appropriate solvent (e.g., ion-exchanged water) to prepare a pasty (or slurry-like) composition, applying an appropriate amount of the composition to the surface of the negative electrode current collector 62, and drying the composition.

As shown in FIG. 2, as the separator 70 (specifically, the first separator 71 and the second separator 72), it is possible to use a separator formed of a conventionally known porous sheet without particular limitation. An example of the separator 70 includes a porous sheet (e.g., a film or a nonwoven fabric) consisting of a resin of polyethylene (PE), polypropylene (PP), polyester, cellulose, or polyamide. Such a porous sheet may have a single-layer structure or may also have a multi-layer structure having two or more layers (e.g., a three-layer structure in which PP layers are stacked on both surfaces of a PE layer). In addition, a configuration may also be adopted in which a porous heat-resistant layer is provided on one or both surfaces of the porous sheet. The heat-resistant layer can be a layer containing, e.g., an inorganic filler and a binder (e.g., a filler layer). As the inorganic filler, for example, alumina, boehmite, or silica can be preferably used.

As shown in FIG. 1, the nonaqueous electrolyte solution 10 accommodated in the battery case 30 together with the wound electrode body 20 contains a supporting electrolyte in an appropriate nonaqueous solvent, and it is possible to use a conventionally known nonaqueous electrolyte solution without particular limitation. As the nonaqueous solvent, it is possible to use, e.g., ethylene carbonate (EC), diethyl carbonate (DEC), dimethyl carbonate (DMC), or ethyl methyl carbonate (EMC). In addition, as the supporting electrolyte, it is possible to suitably use, e.g., a lithium salt (e.g., LiBOB, $LiPF_6$ or the like). In the present embodiment, as the supporting electrolyte, LiBOB is used. In this case, the content of LiBOB in the nonaqueous electrolyte solution 10 is preferably 0.3 wt % to 0.6 wt %.

Figure 4:
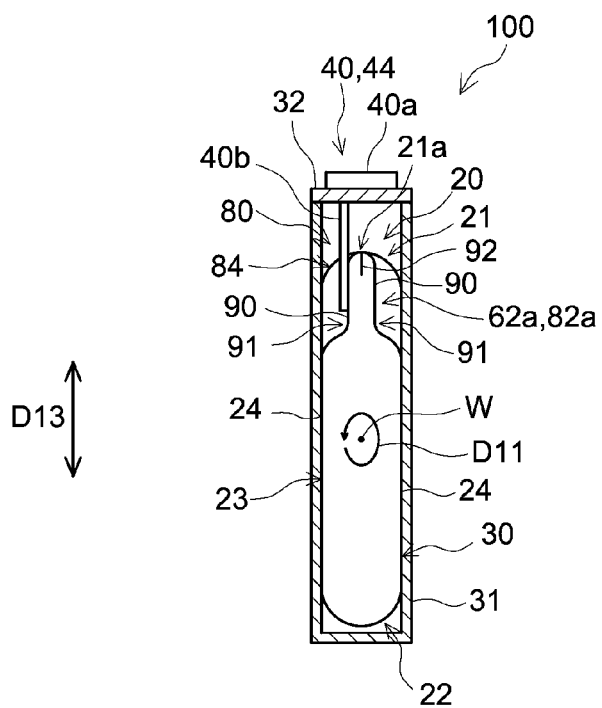
FIG. 4 is a view schematically showing a battery case and the wound electrode body, and is a view when the battery case and the wound electrode body are viewed from a winding axis direction.

Next, the configuration of the wound electrode body 20 according to the present embodiment will be described in greater detail. As shown in FIG. 4, the wound electrode body 20 has a first end portion 21, a second end portion 22, and a flat portion 23. Note that, in FIG. 4, an outer peripheral shape of the wound electrode body 20 is shown and the depiction of a state in which the wound electrode body 20 is wound is omitted. The first end portion 21 is a portion of the wound electrode body 20 in which a rounded portion is formed when viewed from the winding axis direction D12. The first end portion 21 constitutes one end portion in a longitudinal direction D13 orthogonal to the winding axis W in the wound electrode body 20. The second end portion 22 faces the first end portion 21 with the winding axis W positioned therebetween, and is a portion of the wound electrode body 20 in which the rounded portion is formed when viewed from the winding axis direction D12. The second end portion 22 constitutes the other end portion in the longitudinal direction D13 orthogonal to the winding axis W in the wound electrode body 20. In the present embodiment, when the wound electrode body 20 is accommodated in the battery case 30, the first end portion 21 is disposed at a position closer to the lid 32 of the battery case 30 than the second end portion 22, i.e., a position closer to the external terminal portion 40a of the electrode terminal 40 than the second end portion 22. Herein, it is assumed that each of the first end portion 21 and the second end portion 22 includes an outer peripheral surface of the wound electrode body 20 on which the rounded portion is formed and an internal portion of the outer peripheral surface on which the rounded portion is formed.

The flat portion 23 is disposed between the first end portion 21 and the second end portion 22, and has two flat surfaces 24. That is, the first end portion 21 is provided on one side in the longitudinal direction D13 in the flat portion 23, and the second end portion 22 is provided on the other side in the longitudinal direction D13 in the flat portion 23. The flat surface 24 is a flat surface which extends in the longitudinal direction D13. Two flat surfaces 24 face each other. In the present embodiment, in a state in which the wound electrode body 20 is accommodated in the battery case 30, the wound electrode body 20 is disposed such that, from a side close to the lid 32, the first end portion 21, the flat portion 23, and the second end portion 22 are arranged in this order.

In the present embodiment, as shown in FIG. 1, the internal terminal portion 40b of each of the electrode terminals 40 (e.g., the positive electrode terminal 42 and the negative electrode terminal 44) is connected to each of the non-formation portions 82a (e.g., the positive electrode non-formation portion 52a and the negative electrode non-formation portion 62a) positioned at the first end portion 21 of the wound electrode body 20. The portion of the wound electrode body 20 to which the electrode terminal 40 is connected is preferably a flat surface. By joining the electrode terminal 40 to the flat surface, it is possible to connect the electrode terminal 40 to the wound electrode body 20 more reliably. Accordingly, in the present embodiment, as shown in FIG. 4, in order to connect the electrode terminal 40 to the non-formation portion 82a positioned at the first end portion 21 more reliably, a flat surface portion 90 having a flat surface is provided in the non-formation portion 82a positioned at the first end portion 21.

Figure 3:
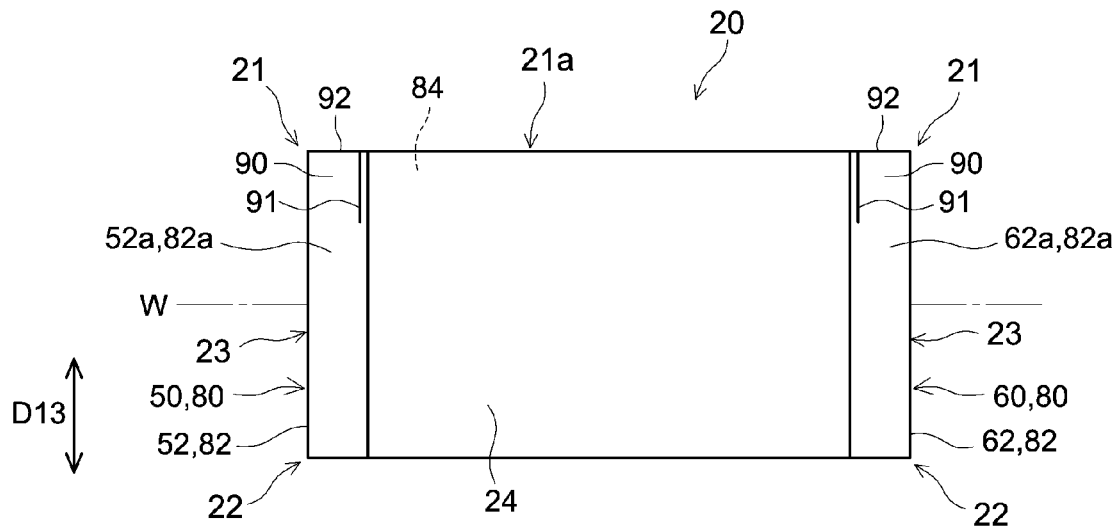
FIG. 3 is a view schematically showing the wound electrode body in a state in which the wound electrode body is wound.

Thus, in order to provide the flat surface portion 90 in each of the non-formation portions 82a (e.g., the positive electrode non-formation portion 52a and the negative electrode non-formation portion 62a) positioned at the first end portion 21, as shown in FIG. 3, a first slit 91 and a second slit 92 are formed in the non-formation portion 82a. The first slit 91 is formed in a portion of the non-formation portion 82a positioned at the first end portion 21, and is a slit which extends along the winding direction D11 (see FIG. 4). At a position corresponding to the first end portion 21 about the winding axis W, the first slit 91 is formed in the non-formation portion 82a. In the present embodiment, an end at a position farthest from the winding axis W in the non-formation portion 82a positioned at the first end portion 21 is referred to as a top end 21a. The top end 21a denotes an end on the side of the lid 32 in the non-formation portion 82a. The first slit 91 is formed in the non-formation portion 82a so as to pass through the top end 21a. The first slit 91 is formed from the portion of the non-formation portion 82a positioned at the first end portion 21 on the side of one of the two flat surfaces 24 of the wound electrode body 20 to the portion of the non-formation portion 82a positioned at the first end portion 21 on the side of the other flat surface 24 through the top end 21a. In the present embodiment, as shown in FIG. 2, the non-formation portion 82a partially overlaps the separator 70. Accordingly, the first slit 91 is formed at a position in the non-formation portion 82a which does not overlap the separator 70.

Figure 5:
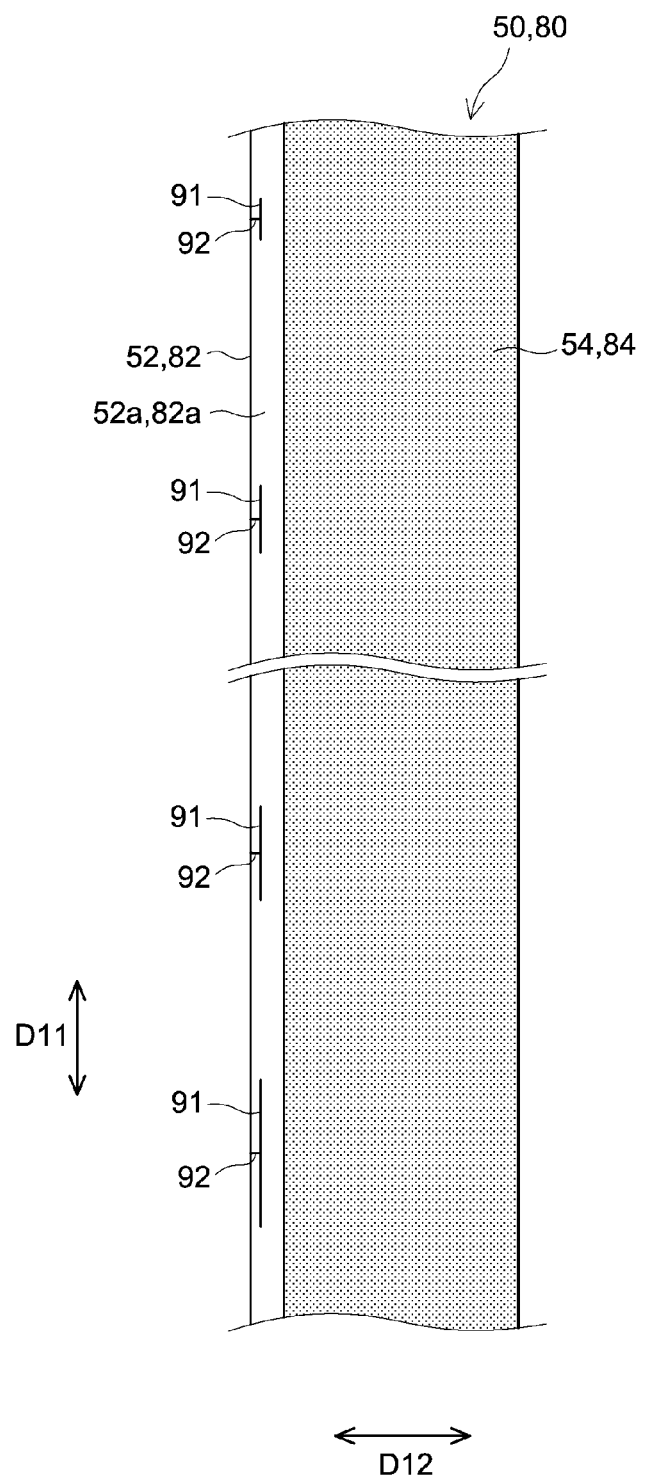
FIG. 5 is a view schematically showing a state in which an electrode sheet according to the embodiment is unfolded.

As shown in FIG. 5, at a position corresponding to the first end portion 21 about the winding axis W, the second slit 92 is formed in the non-formation portion 82a. The second slit 92 is disposed opposite to and farther from each of the electrode active material layers 84 (e.g., the positive electrode active material layer 54 and the negative electrode active material layer 64 (see FIG. 2)) than the first slit 91, and is a slit which extends along the winding axis direction D12. The second slit 92 is a slit which extends opposite to the electrode active material layer 84 along the winding axis direction D12 from the first slit 91. The second slit 92 extends from the first slit 91 to an end of the non-formation portion 82a in the winding axis direction D12. Herein, the second slit 92 is connected to the first slit 91, but the second slit 92 may also be spaced from the first slit 91. In the present embodiment, as shown in FIG. 4, the second slit 92 is formed along the winding axis direction D12 at a position of the top end 21a in the non-formation portion 82a positioned at the first end portion 21. In other words, at a position corresponding to the top end 21a about the winding axis W, the second slit 92 is formed in the non-formation portion 82a. As shown in FIG. 5, the second slit 92 extends toward the winding axis direction D12 from the center of the first slit 91 in the winding direction D11.

Note that, in the present embodiment, the first slit 91 and the second slit 92 are not formed in the non-formation portion 82a other than the portion of the non-formation portion 82a positioned at the first end portion 21. That is, the first slit 91 and the second slit 92 are not formed in a portion of the non-formation portion 82a positioned at the second end portion 22, and are not formed in a portion of the non-formation portion 82a positioned in the flat portion 23.

Figure 6:
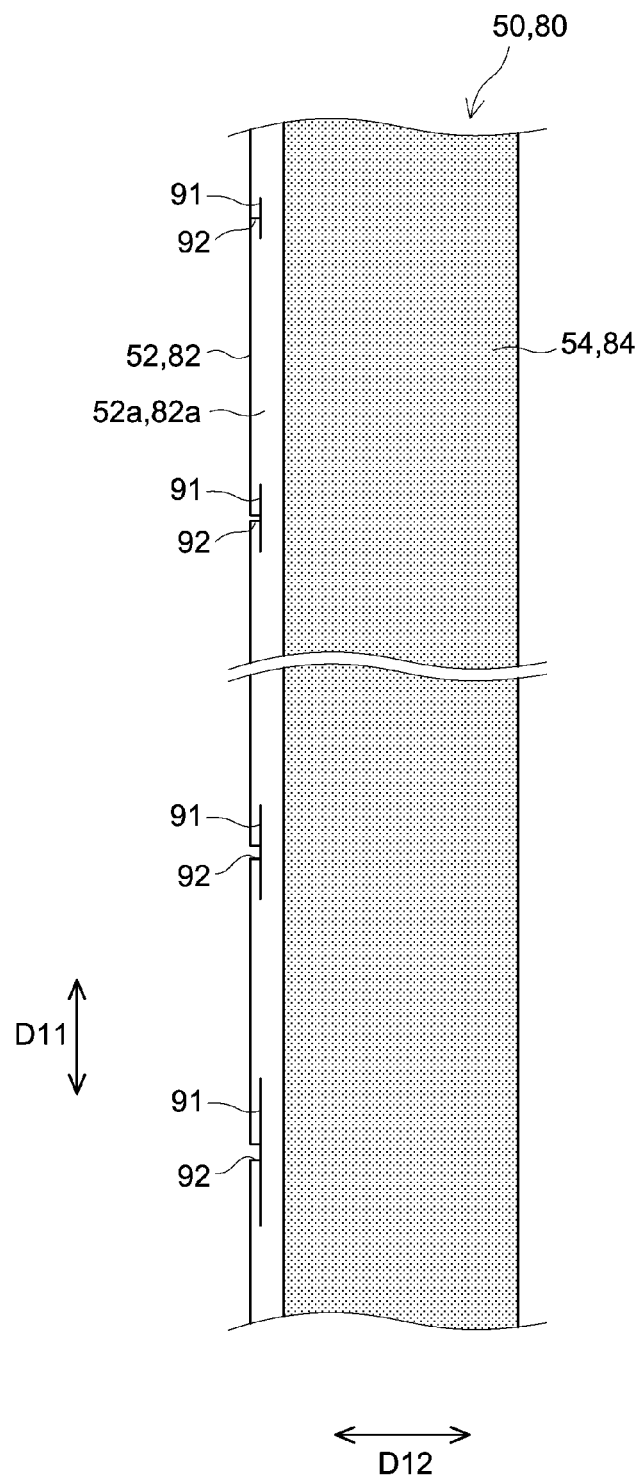
FIG. 6 is a view schematically showing a state in which an electrode sheet according to a modification is unfolded.

In FIGS. 5 and 6, an upper side on a paper sheet corresponds to a side of a winding start of the electrode sheet 80, and a lower side thereon corresponds to a side of a winding end of the electrode sheet 80. In the present embodiment, as shown in FIG. 5, the first slits 91 equal in number to the number of turns of the wound electrode body 20 and the second slits 92 equal in number to the number of turns thereof are formed for each non-formation portion 82a of one electrode sheet 80 of the wound electrode body 20. Herein, an interval between the first slits 91 positioned adjacent to each other in the winding direction D11 when each of the electrode sheets 80 (e.g., the positive electrode sheet 50 and the negative electrode sheet 60 (see FIG. 2)) is unfolded decreases with approach to the side of the winding start in the winding direction D11. Similarly, an interval between the second slits 92 positioned adjacent to each other in the winding direction D11 when the electrode sheet 80 is unfolded decreases with approach to the side of the winding start in the winding direction D11. In other words, the interval between the first slits 91 positioned adjacent to each other in the winding direction D11 and the interval between the second slits 92 positioned adjacent to each other in the winding direction D11 when the electrode sheet 80 is unfolded decrease with approach to an end portion of the winding start of the electrode sheet 80 from an end portion of the winding end of the electrode sheet 80.

In addition, the length of the first slit 91 (specifically, the length in the winding direction D11) decreases with approach to the winding axis W. In other words, when the electrode sheet 80 is unfolded, the length of the first slit 91 decreases with approach to the side of the winding start in the winding direction D11 (e.g., with approach to the end portion of the winding start of the electrode sheet 80). In the present embodiment, the lengths of a plurality of the second slits 92 are equal to each other, but they may also be different from each other.

Further, in the present embodiment, a plurality of the first slits 91 are merely cuts, and the widths of a plurality of the first slits 91 (i.e., another length of a groove of the first slit 91 in the winding axis direction D12) are equal to each other. Similarly, in the present embodiment, as shown in FIG. 5, a plurality of the second slits 92 are also merely cuts, and the widths of a plurality of the second slits 92 (i.e., the length of a groove of the second slit 92 in the winding direction D11)

are equal to each other. However, as shown in a modification in FIG. 6, the width of the second slit 92 may increase with approach to the end portion of the winding end of the electrode sheet 80 from the end portion of the winding start of the electrode sheet 80. In other words, the width of the second slit 92 may increase with distance from the winding axis W.

Note that a timing or method of forming the first slit 91 and the second slit 92 in the non-formation portion 82a of the electrode sheet 80 is not particularly limited. In the present embodiment, as shown in FIG. 2, the wound electrode body 20 is fabricated by winding the electrode sheets 80 (e.g., the positive electrode sheet 50 and the negative electrode sheet 60) and the separator 70 with what is called a winding device (not shown) in a state in which the electrode sheets 80 and the separator 70 are stacked. The first slit 91 and the second slit 92 are automatically formed in the non-formation portion 82a by using, e.g., a blade which operates in synchronization with the winding device. For example, when the electrode sheets 80 and the separator 70, which are stacked, are wound by the winding device, it is possible to form the first slit 91 and the second slit 92 in the non-formation portion 82a by using the blade at a predetermined timing (e.g., a timing when the portion of the non-formation portion 82a which can be positioned at the first end portion 21 passes through a work area in which the slits 91 and 92 are formed by the blade).

In the present embodiment, by forming the first slit 91 and the second slit 92 in the non-formation portion 82a positioned at the first end portion 21, cuts are made at the positions of the first slit 91 and the second slit 92. Consequently, in the non-formation portion 82a positioned at the first end portion 21 of the wound electrode body 20 which is wound, it is possible to flatten a portion closer to an end portion in the winding axis direction D12 in the non-formation portion 82a than the first slit 91. As a result, as shown in FIG. 3, the rounded portion is not formed in the portion closer to the end portion in the winding axis direction D12 in the non-formation portion 82a than the first slit 91, and it is possible to provide the flat surface portion 90. Consequently, as shown in FIG. 4, it is possible to join the electrode terminal 40 (specifically, the internal terminal portion 40b) to the flat surface portion 90. Note that a method of joining the electrode terminal 40 to the flat surface portion 90 is not particularly limited. It is possible to join the electrode terminal 40 to the flat surface portion 90 by, e.g., ultrasonic welding, resistance welding, laser welding, or so-called swaging.

Thus, in the present embodiment, as shown in FIG. 3, by forming the first slit 91 and the second slit 92 in the positive electrode non-formation portion 52a of the positive electrode sheet 50 positioned at the first end portion 21, it is possible to provide the flat surface portion 90 in the positive electrode non-formation portion 52a positioned at the first end portion 21. Similarly, by forming the first slit 91 and the second slit 92 in the negative electrode non-formation portion 62a of the negative electrode sheet 60 positioned at the first end portion 21, it is possible to provide the flat surface portion 90 in the negative electrode non-formation portion 62a positioned at the first end portion 21. Consequently, as shown in FIG. 1, the positive electrode terminal 42 is joined to the flat surface portion 90 of the positive electrode non-formation portion 52a. In addition, the negative electrode terminal 44 is joined to the flat surface portion 90 of the negative electrode non-formation portion 62a.

As described thus far, as shown in FIG. 4, the secondary battery 100 according to the present embodiment includes the flat wound electrode body 20 in which the electrode sheet 80 of the positive electrode or the negative electrode is wound about the winding axis W in the predetermined winding direction D11, the battery case 30 in which the wound electrode body 20 is accommodated, and the electrode terminal 40. The electrode terminal 40 has the external terminal portion 40a disposed outside the battery case 30, and the internal terminal portion 40b disposed inside the battery case 30. As shown in FIG. 2, the electrode sheet 80 has the current collector 82, the electrode active material layer 84, and the non-formation portion 82a. As shown in FIG. 5, the electrode active material layer 84 is the layer which extends in the winding direction D11, is formed on the surface of the current collector 82, and contains the electrode active material. The non-formation portion 82a extends in the winding direction D11, is disposed at the position adjacent to the electrode active material layer 84 in the winding axis direction D12, and, in the non-formation portion 82a, the electrode active material layer 84 is not formed on the surface of the current collector 82. As shown in FIG. 4, the wound electrode body 20 has the flat portion 23 which has the two flat surfaces 24 extending in the longitudinal direction D13, the first end portion 21 which is provided on one side in the longitudinal direction D13 in the flat portion 23 and in which the rounded portion is formed, and the second end portion 22 which is provided on the other side in the longitudinal direction D13 in the flat portion 23 and in which the rounded portion is formed. As shown in FIG. 3, in the portion of the non-formation portion 82a positioned at the first end portion 21, the first slit 91 is formed along the winding direction D11 (see FIG. 4). In the portion of the non-formation portion 82a positioned at the first end portion 21, the flat surface portion 90 to which the internal terminal portion 40b (see FIG. 4) of the electrode terminal 40 is connected is provided in the portion positioned opposite to and farther from the electrode active material layer 84 than the first slit 91.

For example, when the first slit 91 is not formed in the portion of the non-formation portion 82a positioned at the first end portion 21, the non-formation portion 82a is brought into a state in which the rounded portion is formed, and it is difficult to connect the electrode terminal 40 to the portion of the non-formation portion 82a positioned at the first end portion 21. However, in the present embodiment, as shown in FIG. 4, by forming the first slit 91, it becomes easy to flatten the portion of the non-formation portion 82a positioned at the first end portion 21, and it is easy to provide the flat surface portion 90 in the non-formation portion 82a. Therefore, it is possible to reliably join the electrode terminal 40 to the portion of the non-formation portion 82a positioned at the first end portion 21 and, as a result, the length of the electrode terminal 40 (specifically, the length of the internal terminal portion 40b) can be made shorter than that of the conventional electrode terminal.

In the present embodiment, as shown in FIG. 3, in the non-formation portion 82a positioned at the first end portion 21, the second slit 92 which is disposed opposite to and farther from the electrode active material layer 84 than the first slit 91 and extends along the winding axis direction D12 is formed. Thus, by forming the second slit 92 in the non-formation portion 82a, it is possible to separate a portion which can be formed into the rounded portion in the non-formation portion 82a positioned at the first end portion 21. Therefore, it becomes easy to flatten the portion of the non-formation portion 82a positioned at the first end portion 21, and it becomes easy to provide the flat surface portion 90 in the portion of the non-formation portion 82a positioned at the first end portion 21.

In the present embodiment, as shown in FIG. 4, the second slit 92 is formed at the position of the top end 21a which is farthest from the winding axis W in the non-formation portion 82a positioned at the first end portion 21. A portion of the non-formation portion 82a positioned at the top end 21a is a position at which the rounded portion can be formed. Therefore, by forming the second slit 92 at the position of the top end 21a, it is possible to separate the portion which can be formed into the rounded portion in the non-formation portion 82a positioned at the first end portion 21 more reliably. Therefore, it becomes easy to flatten the portion of the non-formation portion 82a positioned at the first end portion 21, and it becomes easy to provide the flat surface portion 90 in the portion of the non-formation portion 82a positioned at the first end portion 21.

In the present embodiment, as shown in FIG. 5, the interval between the first slits 91 when the electrode sheet 80 is unfolded decreases with approach to the side of the winding start in the winding direction D11. In addition, the interval between the second slits 92 when the electrode sheet 80 is unfolded decreases with approach to the side of the winding start in the winding direction D11. Herein, as the number of turns of the wound electrode body 20 decreases, the length of the electrode sheet 80 needed when the electrode sheet 80 is wound one round decreases. Therefore, by decreasing the interval between the first slits 91 and the interval between the second slits 92 with approach to the side of the winding start according to the length of the electrode sheet 80 needed when the electrode sheet 80 is wound one round, it is possible to form the first slit 91 and the second slit 92 in the non-formation portion 82a positioned at the first end portion 21.

In the present embodiment, the length of the first slit 91 decreases with approach to the winding axis W (see FIG. 4). Herein, as the number of turns of the wound electrode body 20 decreases, the length of the non-formation portion 82a positioned at the first end portion 21 in the winding direction D11 decreases. Therefore, by decreasing the length of the first slit 91 with approach to the winding axis W according to the length of the non-formation portion 82a positioned at the first end portion 21 in the winding direction D11, it becomes easy to align a plurality of the first slits 91. As a result, it becomes easy to flatten the portion of the non-formation portion 82a positioned at the first end portion 21, and it becomes easy to provide the flat surface portion 90 in the portion of the non-formation portion 82a positioned at the first end portion 21.

In the present embodiment, while the first slit 91 and the second slit 92 are formed in the portion of the non-formation portion 82a positioned at the first end portion 21, it is possible to omit the second slit 92. Even in this case, the first slit 91 is formed in the non-formation portion 82a, and hence it becomes possible to flatten the portion of the non-formation portion 82a positioned at the first end portion 21 through large force is necessary as compared with the case where the second slit 92 is formed. Therefore, even in the case where the second slit 92 is omitted, it is possible to provide the flat surface portion 90 in the portion of the non-formation portion 82a positioned at the first end portion 21.

What is claimed is:

1. A secondary battery, comprising:
a flat wound electrode body in which an electrode sheet of a positive electrode or a negative electrode is wound about a winding axis in a predetermined winding direction;
a battery case which accommodates the wound electrode body; and
an electrode terminal which has an external terminal portion disposed outside the battery case and an internal terminal portion disposed inside the battery case, wherein
the electrode sheet has:
a current collector;
an electrode active material layer which extends in the winding direction, is formed on a surface of the current collector, and contains an electrode active material; and
a non-formation portion which extends in the winding direction and is disposed at a position adjacent to the electrode active material layer in a winding axis direction and in which the electrode active material layer is not formed on the surface of the current collector,
the wound electrode body has:
a flat portion which has two flat surfaces extending in a longitudinal direction orthogonal to the winding axis direction;
a first end portion which is provided on one side in the longitudinal direction in the flat portion and in which a rounded portion is formed; and
a second end portion which is provided on another side in the longitudinal direction in the flat portion and in which the rounded portion is formed,
a first slit is formed along the winding direction in a portion of the non-formation portion positioned at the first end portion,
a flat surface portion to which the internal terminal portion of the electrode terminal is joined is provided in a portion positioned further toward opposite than the first slit from the electrode active material layer in the portion of the non-formation portion positioned at the first end portion,
a length of the first slit along the winding direction decreases with increasing approach to the winding axis,
the flat surface portion is provided on an outer surface of the non-formation portion, the outer surface of the non-formation portion being adjacent to an outer side of the battery case, and
the length of the first slit along the winding direction is longer than another length of the first slit along the winding axis direction.

2. The secondary battery according to claim 1, wherein an interval between first slits, including the first slit, along the winding direction decreases gradually with increasing approach to a winding start side in the winding direction.

3. The secondary battery according to claim 1, further comprising:
a plurality of second slits extending along the winding axis direction in the non-formation portion positioned at the first end portion, wherein
a width of a second slit of the plurality of second slits closer to the winding axis is less than that of an adjacent second slit of the plurality of second slits further from the winding axis.

4. The secondary battery according to claim 1, wherein the outer surface of the non-formation portion is opposite to an inner surface of the non-formation portion, and faces toward the outer side of the battery case.

5. The secondary battery according to claim 1, wherein a second slit which extends along the winding axis direction is formed in the non-formation portion positioned at the first end portion, and
the first slit is between the second slit and the electrode active material layer in the winding axis direction.

6. The secondary battery according to claim 5, wherein the second slit is formed at a position farthest from the winding axis in the non-formation portion positioned at the first end portion.

7. The secondary battery according to claim 5, wherein an interval between second slits, including the second slit, along the winding direction decreases gradually with increasing approach to a winding start side in the winding direction.

8. The secondary battery according to claim 1, further comprising:
a second slit extending along the winding axis direction in the non-formation portion positioned at the first end portion, wherein the second slit extends from a center of the first slit in the winding direction.

9. The secondary battery according to claim 8, wherein the first slit is between the second slit and the electrode active material layer in the winding axis direction.

10. The secondary battery according to claim 9, wherein the second slit is formed at a position farthest from the winding axis in the non-formation portion positioned at the first end portion.

11. The secondary battery according to claim 1, further comprising:
a plurality of first slits, including the first slit, extending along the winding direction in the portion of the non-formation portion positioned at the first end portion, wherein
the length of the first slit of the plurality of first slits closer to the winding axis is less than that of an adjacent first slit of the plurality of first slits further from the winding axis.

12. The secondary battery according to claim 11, further comprising:
a plurality of second slits extending along the winding axis direction in the non-formation portion positioned at the first end portion, wherein
a width of a second slit of the plurality of second slits closer to the winding axis is less than that of an adjacent second slit of the plurality of second slits further from the winding axis.

13. The secondary battery according to claim 12, wherein each of the plurality of second slits extends along the winding axis direction from a center of a corresponding first slit of the plurality of first slits in the winding direction.

14. The secondary battery according to claim 12, wherein an interval between the plurality of second slits along the winding direction decreases gradually with increasing approach to a winding start side in the winding direction.

15. The secondary battery according to claim 12, wherein an interval between the plurality of first slits along the winding direction decreases gradually with increasing approach to a winding start side in the winding direction.

16. A secondary battery, comprising:
a flat wound electrode body in which an electrode sheet of a positive electrode or a negative electrode is wound about a winding axis in a predetermined winding direction;
a battery case which accommodates the wound electrode body; and
an electrode terminal which has an external terminal portion disposed outside the battery case and an internal terminal portion disposed inside the battery case, wherein
the electrode sheet has:
a current collector;
an electrode active material layer which extends in the winding direction, is formed on a surface of the current collector, and contains an electrode active material; and
a non-formation portion which extends in the winding direction and is disposed at a position adjacent to the electrode active material layer in a winding axis direction and in which the electrode active material layer is not formed on the surface of the current collector,
the wound electrode body has:
a flat portion which has two flat surfaces extending in a longitudinal direction orthogonal to the winding axis direction;
a first end portion which is provided on one side in the longitudinal direction in the flat portion and in which a rounded portion is formed; and
a second end portion which is provided on another side in the longitudinal direction in the flat portion and in which the rounded portion is formed,
a first slit is formed along the winding direction in a portion of the non-formation portion positioned at the first end portion,
a flat surface portion to which the internal terminal portion of the electrode terminal is joined is provided in a portion positioned further toward opposite than the first slit from the electrode active material layer in the portion of the non-formation portion positioned at the first end portion,
a length of the first slit decreases with increasing approach to the winding axis,
the flat surface portion is provided on an outer surface of the non-formation portion, the outer surface of the non-formation portion being adjacent to an outer side of the battery case,
the secondary battery further comprises:
a plurality of first slits, including the first slit, extending along the winding direction in the portion of the non-formation portion positioned at the first end portion, and
a plurality of second slits extending along the winding axis direction in the non-formation portion positioned at the first end portion,
the length of the first slit of the plurality of first slits closer to the winding axis is less than that of an adjacent first slit of the plurality of first slits further from the winding axis,
a width of a second slit of the plurality of second slits closer to the winding axis is less than that of an adjacent second slit of the plurality of second slits further from the winding axis, and
each of the plurality of second slits extends along the winding axis direction from a center of a corresponding first slit of the plurality of first slits in the winding direction.

* * * * *